US 6,591,262 B1

(12) United States Patent
MacLellan et al.

(10) Patent No.: US 6,591,262 B1
(45) Date of Patent: Jul. 8, 2003

(54) COLLABORATIVE WORKLOAD MANAGEMENT INCORPORATING WORK UNIT ATTRIBUTES IN RESOURCE ALLOCATION

(75) Inventors: Scot MacLellan, Rome (IT); Peter Bergersen Yocom, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 318 days.

(21) Appl. No.: 09/630,628

(22) Filed: Aug. 1, 2000

(51) Int. Cl.[7] .............................. G06F 17/30; G06F 7/00
(52) U.S. Cl. .............................. 707/2; 709/103; 709/104
(58) Field of Search ................................. 709/102–108; 707/2, 3

(56) References Cited

U.S. PATENT DOCUMENTS

| | | | | |
|---|---|---|---|---|
| 4,727,487 A | * | 2/1988 | Masui et al. ................... | 706/57 |
| 4,890,227 A | * | 12/1989 | Watanabe et al. .............. | 706/14 |
| 5,345,579 A | * | 9/1994 | Hynes ............................ | 703/2 |
| 5,442,730 A | * | 8/1995 | Bigus ............................. | 706/19 |
| 5,473,773 A | * | 12/1995 | Aman et al. ................... | 709/104 |
| 5,504,894 A | * | 4/1996 | Ferguson et al. .............. | 707/2 |
| 5,548,737 A | * | 8/1996 | Edrington et al. ............. | 712/200 |
| 5,644,720 A | * | 7/1997 | Boll et al. ..................... | 709/227 |
| 5,675,739 A | * | 10/1997 | Eilert et al. ................... | 709/226 |
| 5,704,012 A | * | 12/1997 | Bigus ............................. | 706/19 |
| 5,745,652 A | * | 4/1998 | Bigus ............................. | 706/14 |
| 5,881,238 A | * | 3/1999 | Aman et al. ................... | 709/226 |
| 5,889,944 A | * | 3/1999 | Butt et al. ..................... | 709/203 |
| 5,963,911 A | * | 10/1999 | Walker et al. ................. | 705/7 |
| 2002/0165895 A1 | * | 11/2002 | Arwe et al. ................... | 709/102 |

OTHER PUBLICATIONS

Gibbons, R. "A Historical Application Profiler for Use by Parallel Schedulers", Master's Thesis, Department of Computer Science, University of Toronto, 1997.*
IBM, "OS/390 MVS Planning: Workload Management", publication GC28–1761–06, Dec. 1998.*
Gibbons, R. "A Historical Application Profiler for Use by Parallel Schedulers", Master's Thesis, University of Toronto, 1997.*
Calzarossa, M. and Serazzi, G. "Construction and Use of Multiclass Workload Models", Performance Evaluation, vol. 19, No. 4 1994, pp. 341–352.*
Lo, T.L. "The Evaluation of Workload Management in Data Processing Industry: A Survey", Proceedings of the 1986 Fall Joint Computer Conference, 1986.*

* cited by examiner

*Primary Examiner*—Jean R. Homere
*Assistant Examiner*—Luke S Wassum
(74) *Attorney, Agent, or Firm*—Floyd A. Gonzalez; John E. Campbell

(57) ABSTRACT

A collaborative workload management system comprises a workload scheduler cooperable with a schedule to submit work units for processing on a computer system according to the schedule; and a workload manager adapted to monitor work units being submitted for processing and to allocate resources for processing respective work units on the computer system according to a respective service class of the work units. The workload scheduler further provides the workload manager with work unit attributes as each work unit is submitted for processing, the attributes comprising at least one indicator of the resources typically required by the work unit. The workload manager retrieves the work unit attributes and tunes the resources required to process the work unit according to the work unit's attributes without exceeding the resources allowed for processing work units of the work unit's service class.

8 Claims, 2 Drawing Sheets

COLLABORATIVE WORKLOAD MANAGEMENT INCORPORATING WORK UNIT ATTRIBUTES IN RESOURCE ALLOCATION

FIELD OF INVENTION

The present invention relates to collaborative workload management where an improved workload scheduler and workload manager better the overall distribution and balancing of work in a computing system, resulting in a better throughput of work, better utilisation of system resources, and more consistent processing times.

BACKGROUND OF THE INVENTION

A workload scheduler is a software component that submits work for execution according to a predefined schedule. Factors that affect when the work is submitted include temporal values like date, time, day-of-the-week, and dependencies such as the completion of preceding work items and resource availability.

One example of a workload scheduler is described in "Tivoli OPC General Information," IBM Pub. No. GH19-4372-02 (December 1999) and related publications. Tivoli OPC (Operations, Planning & Control) automates, monitors, and controls the flow of work through an enterprise's entire data processing operation on both local and remote systems.

A workload manager (WLM) on the other hand is a software component that manages system resources that are to be made available to each executing work item based on performance criteria that define, implicitly or explicitly, relative priorities between competing work items.

One example of a workload manager is described in "OS/390 MVS Planning: Workload Management," IBM Pub. No. GC28-1761-07 (March 1999), and "OS/390 MVS Programming: Workload Management Services," IBM Pub. No. GC28-1773-06 (March 1999). This workload manager balances workload among the systems of an S/390 parallel sysplex cluster in order to achieve optimal load balancing and system performance.

The use of the terms work, work unit, and unit of work in this context are interchangeable, and are used to represent useful user-defined processing on a computer system. The particular term applied by users of the computer system depends on the system type—common terms include job and task.

In the example of OS/390, each work unit is associated with a service class, for example, online transaction, high priority batch, low priority batch, etc. Each service class carries with it a set of parameters which indicate to the WLM the performance criteria of the associated work units, so that if the WLM notes that the resources being allocated to work units of a given service class are repeatedly failing to enable work units of that service class to meet their performance criteria, the WLM can adjust the resources being allocated to work units of that service class. (The techniques used in this adjustment are beyond the scope of the present invention, but are nonetheless well known in the art.)

Beyond this, however, the WLM is unable to make workload management decisions which take into account either the history of an individual job of a given service class or the state of an instance of a job as it is being currently processed.

Companies are becoming increasing more reliant on workload schedulers to automate the submission of large quantities of work and to complete the workload within an increasingly small window of time as so the above problems are becoming more and more pertinent.

An attempt to solve the problems of individual jobs repeatedly failing to meet performance criteria or instances of jobs failing to meet performance criteria has been made with the V2R3 release of Tivoli Operations and Control (OPC) in December, 1999. OPC, as a workload scheduler running on OS/390, identifies late-running, long-running, or late-starting jobs, and attempts to reduce the delay to the workload by moving the jobs to a higher performing WLM service class. However, this can produce highly erratic results, as the aid that a late job will receive is directly tied to the customer's service class definitions, so any benefits can range from negligible to dramatic overcompensation at the cost of competing work.

DISCLOSURE OF THE INVENTION

According to the present invention there is provided a collaborative workload management system comprising: a workload scheduler cooperable with a schedule to submit work units for processing on a computer system according to said schedule; and a workload manager adapted to monitor work units being submitted for processing on said computer system and to allocate resources for processing respective work units on said computer system according to a respective service class of said work units, said service class defining resources allowed for processing a work unit of said service class; said workload scheduler being adapted to further provide the workload manager with work unit attributes as each work unit is submitted for processing, said attributes comprising at least one indicator of the resources typically required by said work unit; and said workload manager being adapted to retrieve said work unit attributes and to tune the resources required to process said work unit according to said work unit's attributes without exceeding the resources allowed for processing work units of said work unit's service class.

Thus, using the invention, the workload scheduler aids the workload manager in achieving business goals by providing it with the attributes of work as it is being submitted for processing. In this way the workload manager can make intelligent decisions about where and how the work will be executed (e.g. which system in a clustered system environment), based on how much system resource is likely to be consumed by the work unit, and what type of system resource the work unit requires.

Preferably, the workload manager further aids the workload scheduler to achieve its goal of scheduling work according to its predefined schedule. The scheduler solicits this aid from the workload manager in situations where the workload is running late with respect to the schedule. This situation happens if:

a. A unit of work runs late by not finishing by the end time defined in the schedule b. A unit of work begins execution late by starting after the scheduled start time c. A unit of work overruns by execution for longer than its scheduled duration This helps achieve performance criteria for a job particularly when unpredicted delays take place.

In particular and by contrast to OPC V2R3, the invention uses the intelligence of the workload manager to aid a late work unit without ignoring the job's service class performance criteria and without the risk of negatively impacting competing work.

BRIEF DESCRIPTION OF THE DRAWINGS

An embodiment of the invention will now be described with reference to the accompanying drawings, in which.

DESCRIPTION OF THE PREFERRED EMBODIMENTS

On many computer systems statistics about the execution of a work unit are recorded for reporting purposes. Examples of such statistics include CPU time used, elapsed time (duration), number of I/O requests, memory requirements, etc.

In the preferred embodiment, the workload scheduler imports such statistics, and creates a profile at least for each work unit that is run regularly. The profile is updated with newly imported statistics (preferably discarding wildly different values as anomalies) to maintain an adaptive profile that is representative of the work unit's likely resource requirements. The factors affecting the profile update are preferably tuned with user-adjustable parameters including a smoothing factor and an anomaly identifying limit.

When a work unit is subsequently submitted for execution, it carries its profile with it. The workload manager examines the profile, and decides where the work should be run based on a comparison of resource requirements with the characteristics of any systems available to run the work. For instance, if the profile for a particular work unit indicates that it is very CPU-intensive, the workload manager might choose not to execute the work on a system that is currently running at a high CPU usage, but would select a system where the CPU is relatively idle. Similarly, a work unit that requires many I/O operations but little CPU could be run on a system with a high CPU usage as long as there is relatively little I/O usage.

Choosing the appropriate system for execution distributes potentially competing work amongst different systems, and allows work with complementary resource requirements to run together, maximising the resources of the system and producing consistent results.

Figure 1:
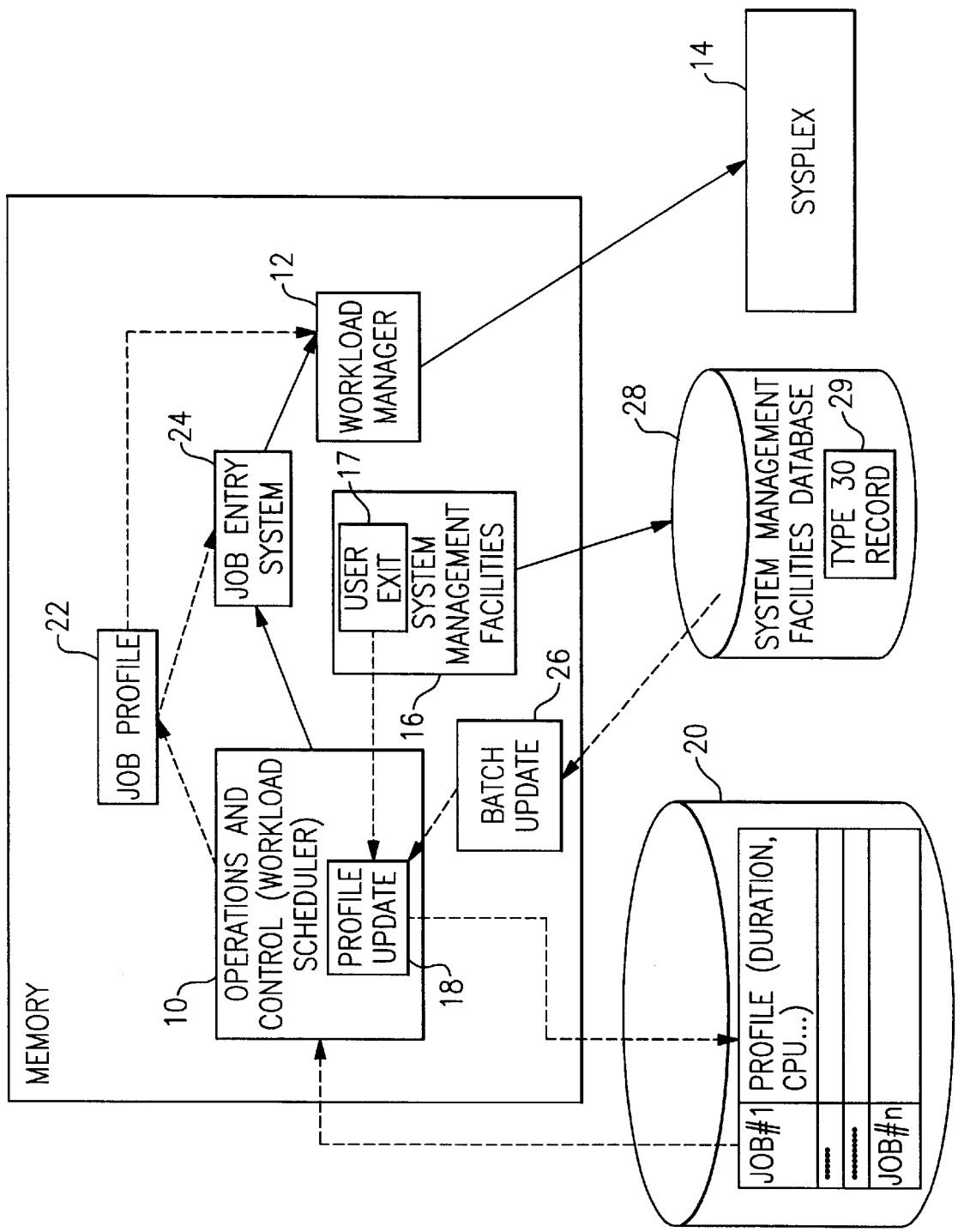
FIG. 1 illustrates both the components involved in the preferred embodiment and their sequence of operation.

Referring now to FIG. 1 solid lines represent the conventional flow of job execution and hashed lines illustrate the steps of the embodiment. The preferred embodiment of the invention is described in terms of the OS/390 operating system where OPC 10 is adapted to operate as the scheduler of the invention and WLM 12 is adapted to operate as the workload manager of the invention for distributing jobs for processing on for example an IBM S/390 parallel sysplex cluster 14.

Currently in such an environment, OPC keeps a job duration record (not shown), built as a running average of historical data, in a database accessible to OPC. This information is used by OPC when creating the schedule for the submission of work—in OPC this is referred to as Current Plan. The duration of a job is a critical piece of information when planning the appropriate start times of jobs in order that they do not finish beyond their deadline time, and to avoid that a chain of dependent jobs does not run beyond the end time of the schedule as a whole.

In OS/390, when a job ends System Management Facilities (SMF) 16 collects statistics about the execution of the job in a database 28. The statistics include details of the particular instance of the job including, for example, CPU seconds used, the amount of input/output, the amount of memory use, and the number of service units consumed (Service units are a concept comprising an intelligent weighted mix of various resource consumption factors).

Currently, WLM adjusts the amount of such resources that is allocated for processing jobs of a given service class. Thus, if such jobs are seen as persistently failing to meet performance criteria set for such a service class, then the resources allocated to process jobs of such a service class are adjusted accordingly.

However, it will be seen that, among other problems, where the resources required to process a given job of a given service class differ measurably from those of other jobs in the service class, then any tuning by the WLM of the resources for that service class is unlikely to produce an optimal result.

The OPC V2R3 solution for addressing the problem of a single job of a given service class failing to meeting a performance criterion, means that a program external to WLM changes the service class of the job to a high resource service class. This, however, can produce erratic results as a program with little knowledge of the conditions WLM operates under is making crude determinations about what WLM should do.

In the preferred embodiment of the invention, however, OPC is adapted to make use of a user exit 17 allowing OPC to capture the above details of a job before they are written as an "SMF type 30" record 29 to the SMF database 28.

In the same manner as a running average of the job duration is currently stored by OPC, each detail of the job is used by a profile updating module 18 to update a running average of the corresponding detail for the job which is stored in a job profile in a database 20.

An alternative method of updating the profile sees a batch job 26 scanning all of the relevant SMF records in one operation, and performing a bulk update of the profiles on a regularly scheduled period (for example once per day). This approach is best used when it is preferable to off load the processing overhead to a less busy time of day.

Before a job is submitted for processing, OPC reads the job profile from storage and writes the profile to a memory location 22. OPC then calls the operating system to begin the job which can be, for example, a batch task written in JCL (Job Control Language) or a "started task".

Jobs are received by the operating system via a Job Entry Subsystem (JES) 24, and, in the preferred embodiment, a parameter pointing to the memory location 22 in which the job profile is stored is added to the JES API.

Normally, the WLM monitors the jobs submitted through the JES, in order to allocate the appropriate resources that are required according the service class associated to the jobs. In the preferred embodiment, the WLM uses the pointer location 22 passed to the JES from the OPC to read the contents of the job profile and to make any necessary decisions to ensure that the job meets its performance criteria without going outside the parameters tuned for the job's service class. This decision may be, for example, to move the job to another system which has abundant available resources of the kind consumed by this particular job.

In this embodiment, it will be seen that the scheduler essentially passes the same information to the WLM for every instance of a job. However, there are many cases where, possibly for exceptional reasons, the execution environment for one instance of a job will differ from that of another.

Thus, in a further development of the embodiment, the workload scheduler communicates a request for aid to the workload manager, passing whatever attributes are necessary to uniquely identify the unit of work in need of aid. The workload manager will then favour this work over its peers, assigning it extra system resource up to the limits allowed by the business goal definitions. This extra resource allows the work unit to finish quicker, reducing the delay in the case of long-running or late-running work. In the case of late-starting work, any extra resources could actually allow the work to finish according to its scheduled end time.

In more detail, it is known in OPC V2R3 for the scheduler to determine if a job starts late, finishes late or is taking too long to complete. In the case of OPC V2R3, the scheduler can be configured to intervene in workload management if it detects any one or combination of these states.

Figure 2A:
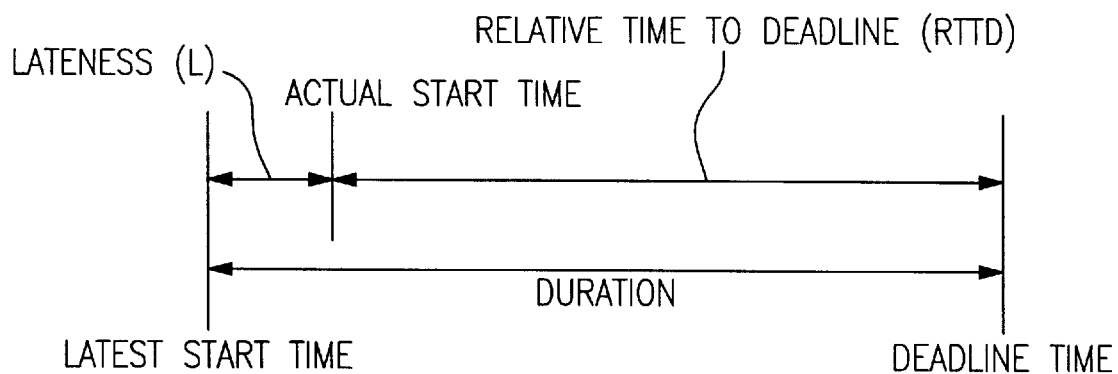
FIGS. 2(a) and 2(b) illustrate a timeline for the execution of a job and a method for determining when a scheduler should intervene in workload management.

Referring to FIG. 2(a), where OPC is set to intervene when a job starts late, OPC detects jobs that either have an explicit start time and start after that time, or jobs that have a designated deadline time and a known duration. If such jobs start after the deadline time minus the duration (possibly taking into account a threshold) i.e. the latest start time, then they are deemed to be starting late and the scheduler intervenes.

Where OPC is set to intervene when a job finishes late, it is simply a matter of detecting that a job has not completed before its designated deadline time (again possibly taking into account a threshold) for the scheduler to intervene.

Where OPC is set to intervene if a job is taking too long, again it is a matter of detecting if a job which is still running has exceeded its normal duration (possibly by more than a threshold) for the scheduler to intervene.

Figure 2B:
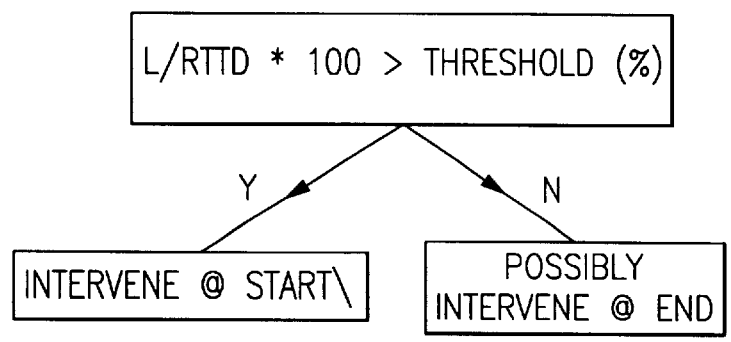

In the case where OPC is configured to intervene either when a job starts or finishes late, an algorithm is used to determine when intervention might be needed. Referring to FIG. 2(b), if a job starts late, and if its lateness divided by the time remaining to its deadline time (RTTD) expressed as a percentage exceeds a threshold, then the scheduler will intervene as the job starts. Otherwise, the scheduler (as the job started acceptably late) waits to see if the job will actually finish late and only intervenes then if the jobs actually finishes late.

Whereas OPC V2R3, however, intervened to change the service class of the job, in the preferred embodiment, OPC intervenes by only sending a message to WLM using, for example, the event notification facility in MVS, to uniquely identify the instance of the job that is in need of assistance. WLM then decides which extra resources (if any) are available to process the job thus mitigating the effect of the re-balancing on work being simultaneously processed.

Thus, the invention through collaboration between the scheduler and workload manager (rather than a heavy handed prior art approach) enables customised management of individual jobs and instances of individual jobs to enable a scheduler to provide improved fulfilment of performance criteria for a job without needing to override the normal operation of the workload manager. The invention ensures a more timely completion of scheduled work, and reduces the possibility of delays which can result in a considerable financial overhead to a business.

What is claimed is:

1. A collaborative workload management system comprising:
   a workload scheduler cooperable with a schedule to submit work units for processing on a computer system according to said schedule; and
   a workload manager that monitors work units being submitted for processing on said computer system and allocates resources for processing respective work units on said computer system according to a respective service class of said work units, said service class defining resources allowed for processing a work unit of said service class;
   said workload scheduler that further provides the workload manager with work unit attributes as each work unit is submitted for processing, said attributes comprising at least one indicator of the resources typically required by said work unit; and
   said workload manager that retrieves said work unit attributes and tunes the resources required to process said work unit according to said work, unit's attributes without exceeding the resources allowed for processing work units of said work unit's service class.

2. A collaborative workload management system according to claim 1 wherein said workload scheduler: determines the resources used in processing each work unit; calculates said attributes as a function of said resources and any resources previously used to process said work unit; and stores said attributes.

3. A collaborative workload management system according to claim 1 wherein said work unit attributes comprise one or more of: CPU seconds used, an amount of input/output, an amount of memory use; and a number of service units consumed.

4. A scheduler for a collaborative workload management system comprising:
   a workload scheduler cooperable with a schedule to submit work units for processing on a computer system according to said schedule, said computer system including resources allocated by a workload manager for processing respective work units according to a respective service class of said work units; and
   an adapted workload scheduler providing said workload manager with work unit attributes as each work unit is submitted for processing, said attributes comprising at least one indicator of the resources typically required by said work unit, so that said workload manager may allocate resources according to said work unit's attributes without exceeding the resources allowed for processing work units of said work unit's service class.

5. A workload manager for a collaborative workload management system comprising:
   a workload manager monitor monitoring work units being submitted for processing on a computer system by a workload scheduler according to a schedule;
   a workload manager allocator allocating resources for processing respective work units on said computer system according to a respective service class of said work units, said service class defining resources allowed for processing a work unit of said service class;
   a workload manager retriever retrieving work unit attributes provided by said workload scheduler as each work unit is submitted for processing, said attributes comprising at least one indicator of the resources typically required by said work unit; and
   a workload manager tuner tuning the resources required to process said work unit according to said work unit's attributes without exceeding the resources allowed for processing work units of said work unit's service class.

6. A method of collaborative workload management comprising the steps of:
   a workload scheduler, cooperable with a schedule, submitting work units for processing on a computer system according to said schedule; and a workload manager monitoring work units being submitted for processing on said computer system and allocating resources for processing respective work units on said computer system according to a respective service class of said work units, said service class defining resources allowed for processing a work unit of said service class;

said workload scheduler further providing the workload manager with work unit attributes as each work unit is submitted for processing, said attributes comprising at least one indicator of the resources typically required by said work unit; and said workload manager retrieving said work unit attributes and tuning the resources required to process said work unit according to said work unit's attributes without exceeding the resources allowed for processing work units of said work unit's service class.

7. A computer program product comprising computer program code stored on a computer readable storage medium for, when executed on a computing device, scheduling work units to be processing on a computer system, the program code comprising:

computer readable program code cooperable with a schedule to submit work units for processing on a computer system according to said schedule, said computer system including resources allocated by a workload manager for processing respective work units according to a respective service class of said work units; and computer readable program code for providing said workload manager with work unit attributes as each work unit is submitted for processing, said attributes comprising at least one indicator of the resources typically required by said work unit, so that said workload manager may allocate resources according to said work unit's attributes without exceeding the resources allowed for processing work units of said work unit's service class.

8. A computer program product comprising computer program code stored on a computer readable storage medium for, when executed on a computing device, allocating resources for processing work units on a computer system, the program code comprising:

computer readable program code for monitoring work units being submitted for processing on a computer system by a workload scheduler according to a schedule;

computer readable program code for allocating resources for processing respective work units on said computer system according to a respective service class of said work units, said service class defining resources allowed for processing a work unit of said service class;

computer readable program code for retrieving work unit attributes provided by said workload scheduler as each work unit is submitted for processing, said attributes comprising at least one indicator of the resources typically required by said work unit; and computer readable program code for tuning the resources required to process said work unit according to said work unit's attributes without exceeding the resources allowed for processing work units of said work unit's service class.

* * * * *

UNITED STATES PATENT AND TRADEMARK OFFICE
CERTIFICATE OF CORRECTION

PATENT NO. : 6,591,262 B1  Page 1 of 1
DATED : July 8, 2003
INVENTOR(S) : Scot MacLellan et al.

It is certified that error appears in the above-identified patent and that said Letters Patent is hereby corrected as shown below:

Column 6,
Line 13, "said workload manager that retrieves said work unit attributes and tunes the resources required to process said work unit according to said work, unit's attributes without exceeding the resources allowed for processing work units of said work unit's service class." should read
-- said workload manager that retrieves said work unit attributes and tunes the resources required to process said work unit according to said work unit's attributes without exceeding the resources allowed for processing work units of said work unit's service class. --

Signed and Sealed this

Twenty-eighth Day of October, 2003

JAMES E. ROGAN
*Director of the United States Patent and Trademark Office*